United States Patent [19]
Baumgarten et al.

[11] Patent Number: 5,755,031
[45] Date of Patent: May 26, 1998

[54] METHOD FOR ATTACHING A ROTOR BLADE TO AN INTEGRALLY BLADED ROTOR

[75] Inventors: Robert W. Baumgarten, Palm Beach Gardens; Kenneth D. Coolidge, Hobe Sound, both of Fla.

[73] Assignee: United Technologies Corporation, Hartford, Conn.

[21] Appl. No.: 748,172

[22] Filed: Nov. 12, 1996

[51] Int. Cl.⁶ ............................................. B23P 15/00
[52] U.S. Cl. ............................ 29/889.1; 29/889.721; 29/889.722
[58] Field of Search ................ 29/889.1, 402.08, 29/402.09, 402.11, 402.12, 402.13, 402.18, 402.19, 889.721, 889.722

[56] References Cited

U.S. PATENT DOCUMENTS

| | | | |
|---|---|---|---|
| 3,574,924 | 4/1971 | Dibble | 29/401 |
| 3,758,347 | 9/1973 | Stalker | 148/4 |
| 4,063,939 | 12/1977 | Weaver et al. | |
| 4,784,573 | 11/1988 | Ress, Jr. | 416/213 R |
| 4,864,706 | 9/1989 | Jenkel | 29/156.8 R |
| 4,873,751 | 10/1989 | Walker et al. | 29/156.8 B |

FOREIGN PATENT DOCUMENTS 2 240 063 A  7/1991  United Kingdom.

*Primary Examiner*—Irene Cuda
*Attorney, Agent, or Firm*—Richard D. Getz

[57] ABSTRACT

A method for replacing a rotor blade on an integrally bladed rotor having a disk is provided, comprising the steps of: (a) removing a damaged rotor blade, leaving a stub portion of the rotor blade extending out from the disk, the stub portion of the rotor blade having a suction side and a pressure side; (b) providing a die, having a pressure side and a suction side, wherein each side includes a platform trough; (c) fastening the die to the rotor blade stub, with the pressure side of the die positioned on the pressure side of the stub, and the suction side of the die positioned on the suction side of the stub; (d) extruding a portion of the rotor blade stub into the platform troughs, thereby creating a platform; and (e) attaching a rotor blade to the platform.

25 Claims, 3 Drawing Sheets

FIG. 1
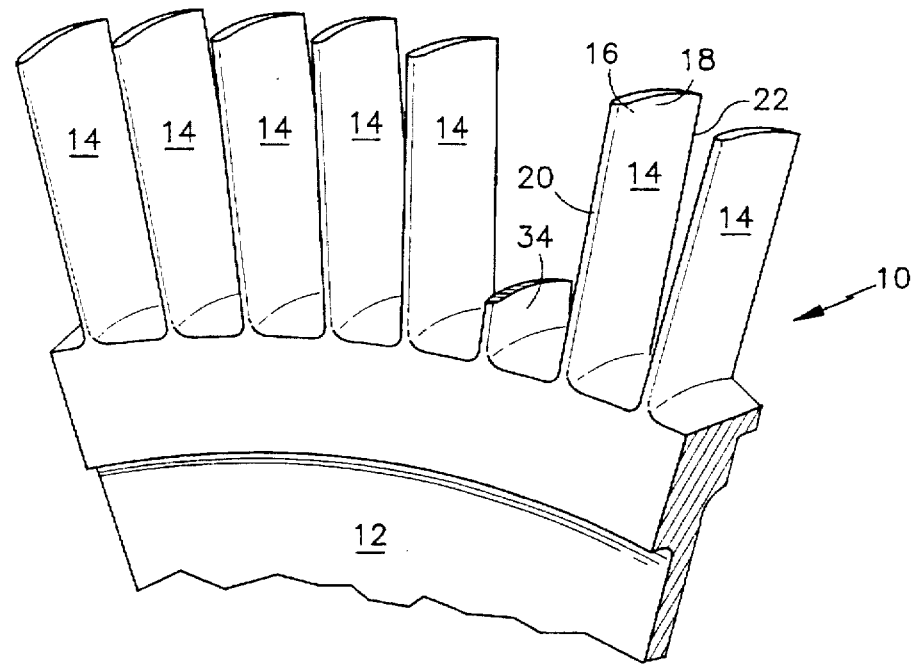
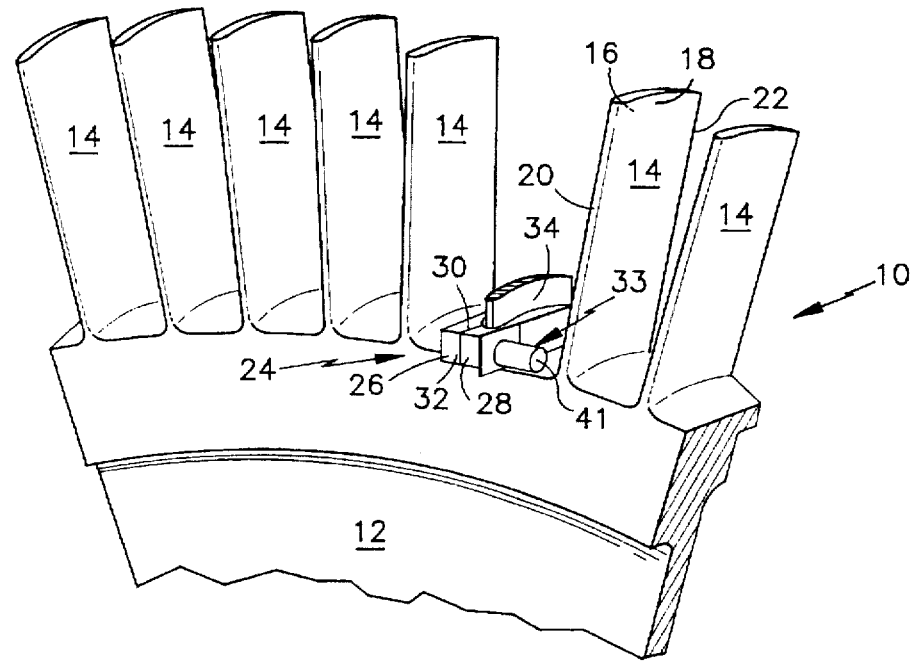
FIG. 2

METHOD FOR ATTACHING A ROTOR BLADE TO AN INTEGRALLY BLADED ROTOR

BACKGROUND OF THE INVENTION

1. Technical Field

This invention relates to integrally bladed rotors for a gas turbine engine in general, and to methods of fabricating or repairing integrally bladed rotors in particular.

2. Background Information

Compressor and turbine sections of a gas turbine engine typically include a plurality of rotor and stator vane assemblies. The rotor assemblies are designed to impart work into core gas passing through the compressor section and extract work from the core gas passing through the turbine section. The stator vane assemblies help to direct the core gas entering or exiting the rotor assemblies, and thereby increase the efficiency of the engine.

Each rotor assembly includes a disk and a plurality of blades attached to the disk, evenly distributed around the circumference of the disk. Historically, the blades have been attached to the disk by mechanical means such as a "fir tree" type attachment where a fir tree shaped blade root is received within a mating recess in the disk. An advantage of mechanically attaching a blade is that the blade can be readily replaced in the event it is damaged or found defective. A disadvantage of mechanically attaching rotor blades is that the rotor disk must be sufficiently sized to receive all the blade roots of the assembly, and be able to withstand the considerable stresses created by the mechanical attachment. Another disadvantage of rotor assemblies with mechanically attached blades is the weight of the assembly. In most mechanical attachment schemes, the disk must be larger than would be otherwise necessary to accommodate the blade roots. The additional weight of the larger disk and the hardware necessary to secure the blades to the disk, undesirably increase the weight of the rotor assembly.

Integrally bladed rotors (IBR's) overcome many of the disadvantages of rotor assemblies using mechanical attachment schemes. In an integrally bladed rotor, the blades are metallurgically bonded to the disk. The metallurgical bond obviates the need for attachment hardware and the weight associated therewith. Metallurgically attaching the blades also permits the use of a rotor disk smaller, and therefore lighter, than would be acceptable in a comparable rotor assembly having a mechanical attachment scheme.

A disadvantage of IBR's is that the metallurgically attached blades cannot be replaced simply by sliding a blade into or out of a recess in the disk. A person of skill in the art will recognize that IBR's are expensive and that some percentage of IBR rotor blades will be manufactured with unacceptable defects and/or be subjected to "foreign object damage" (FOD) while in service. In either case, it may be necessary to replace one or more blades to ensure the integrity of the IBR and avoid scraping an expensive part.

What is needed, therefore, is a method for integrally attaching rotor blades to a rotor disk for purposes of either fabricating an IBR, or repairing one.

DISCLOSURE OF THE INVENTION

It is, therefore, an object of the present invention to provide a method for attaching rotor blades in an integrally bladed rotor.

It is another object of the present invention to provide a method for repairing integrally bladed rotors including the replacement of a rotor blade.

According to the present invention, a method for replacing a rotor blade on an integrally bladed rotor having a disk is provided, comprising the steps of:

(a) removing a damaged rotor blade, leaving a stub portion of the rotor blade extending out from the disk, the stub portion of the rotor blade having a leading edge, a trailing edge, a suction side, and a pressure side;

(b) providing a blade repair die, having a pressure side and a suction side, wherein each side includes a platform trough;

(c) fastening the die to the rotor blade stub, with the pressure side of the die positioned on the pressure side of the stub, and the suction side of the die positioned on the suction side of the stub;

(d) extruding a portion of the rotor blade stub into the platform troughs, thereby creating a platform; and (e) attaching a replacement rotor blade to the platform.

According to an embodiment of the present invention, a method for fabricating an integrally bladed rotor is provided, comprising the steps of:

(a) providing a disk, having a plurality of rotor blade stubs extending outwardly from the disk, wherein the rotor blade stubs are disposed about the circumference of the disk, and each rotor blade stub has a leading edge, a trailing edge, a suction side, and a pressure side;

(b) providing a plurality of rotor blades;

(c) providing a blade attachment die, having a pressure side, with a first platform trough, and a suction side, with a second platform trough;

(d) fastening the blade attachment die to the rotor blade stub; and (e) bonding one of the rotor blades to one of the rotor blade stubs, wherein a portion of each rotor blade stub extrudes into the first and second platform troughs of the die during bonding.

An advantage of the present invention is that a method for attaching rotor blades in an IBR is provided which can be used to repair IBR's already in service, or which can be used as an original method of attachment.

Another advantage of the present invention is that a method for repairing IBR's is provided which minimizes mechanical distortion of the rotor blade stub. Under some prior art replacement blade attachment methods, the rotor blade stub must be exposed to a significant amount of thermal energy prior to attachment of the replacement blade. As a result, the stub can mechanically distort, particularly around the leading and trailing edges. The present invention, in contrast, provides support along the leading and trailing edges to avoid undesirable distortion.

Another advantage of the present invention is that a variety of metallurgical attachment procedures can be used to attach the replacement blade to the rotor blade stub. The present invention provides for the creation of a platform to which the replacement blade can be attached. The platform provides an increased surface area to facilitate metallurgical bonding.

Another advantage of the present invention is that imperfections in the bond that can occur along the sides of the bond plane do so, if at all, outside the bond area of the finished blade. Specifically, the side areas of the platforms that are formed are outside the finished shape of the attached blade. Accordingly, any imperfections that occur along those side areas are machined away prior to completion of the attachment process.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 1 is a diagrammatic view of an integrally bladed rotor section.

FIG. 2 shows the present invention repair device installed on the rotor section shown in FIG. 1.

BEST MODE FOR CARRYING OUT THE INVENTION

Figure 3:
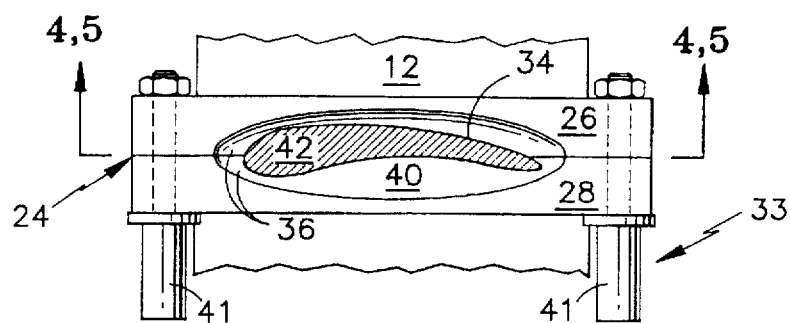
FIG. 3 is a diagrammatic top view of an integral rotor blade stub captured within the blade repair die, prior to extrusion of the blade stub.

Referring to FIG. 1, a section of an integrally bladed rotor (IBR) 10 includes a disk 12 having a plurality of blades 14 extending radially out from the disk 12. Each of the blades 14 is metallurgically bonded to the disk 12. Each blade 14 includes a pressure side 16, a suction side 18, a leading edge 20, and a trailing edge 22.

Referring to FIGS. 2–5, a blade repair die 24 includes a pressure side 26 half and a suction side 28 half, a top 30 and bottom 32 surface, and means 33 for securing the two halves 26,28 to a blade stub 34. Each half 26,28 includes a recess 36 (see FIGS. 3–5) having an airfoil section 38 and a platform trough 40. The geometries of the airfoil sections 38 substantially conform with the pressure 16 and suction 18 sides of the rotor blade stub 34, respectively. The platform troughs 40 within the die halves 26,28 extend away from airfoil sections 38, into the die halves 26,28 a distance before terminating at the top surface 30. The means 33 for securing the two die halves 26,28 to the blade stub 34 includes a pair of hydraulic cylinders 41, or other mechanical clamping means (not shown).

Figure 7:
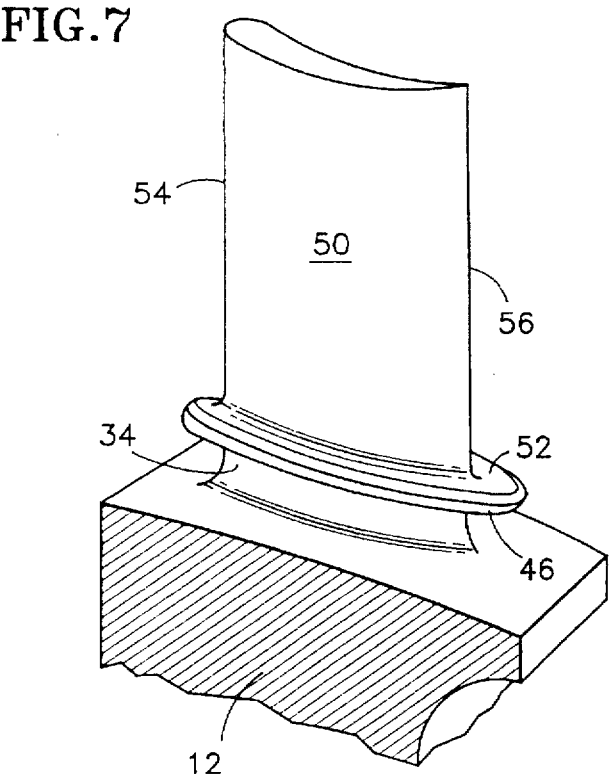
FIG. 7 is a diagrammatic perspective view of a replacement blade bonded to the platform of the integral rotor blade stub.

Referring to FIG. 1, under the present invention an IBR 10 having a damaged or defective rotor blade 14 may be repaired by replacing the damaged or defective blade 14 with a replacement blade 50 (see FIG. 7). The first step in the repair is to separate the damaged/defective blade 14 from the disk 12, leaving a portion of the damaged blade 14 extending out from the disk 12; i.e., a blade stub 34. The desired height of the stub 34 will depend on the application at hand; i.e., the original height of the rotor blade 14 to be repaired, the size of the blade repair die 24, the nature of the damage or defect, etc. The radial outer surface 42 (see FIG. 4) of the stub 34 can be subsequently machined to predetermined flatness specifications at a particular orientation relative to the disk 12.

To facilitate handling, the IBR 10 is attached to a fixture (not shown) that allows the position of the IBR 10 to be readily manipulated and therefore handled more easily. The blade repair die 24 is attached to the blade stub 34 with the bottom surface 32 of the die 24 positioned adjacent the IBR disk 12. The radial position of the die 24 on the blade stub 34 is such that a specific portion of the blade stub 34 (labeled "x") extends above the airfoil sections 38 (see FIG. 4). The hydraulic cylinders 41 secure the die halves 26,28 to the blade stub 34 with a force sufficient to prevent the die 24 from moving relative to the blade stub 34, but not enough force to mechanically deform the blade stub 34.

Figure 4:
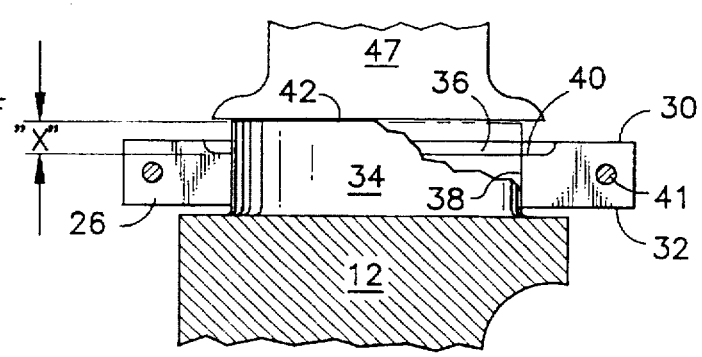
FIG. 4 is a diagrammatic cross-sectional view of the integral rotor blade stub shown in FIG. 3, received within one half of the present invention repair device.
Figure 5:
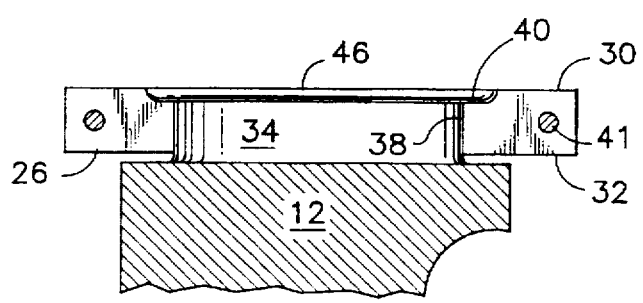
FIG. 5 shows the integral rotor blade stub shown in FIG. 4, with a portion of the blade stub extruded into the platform trough of the form.
Figure 6:
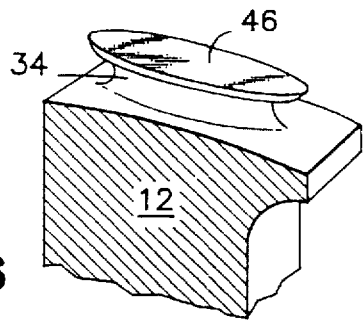
FIG. 6 is a diagrammatic perspective view of the integral rotor blade stub with a platform.

Referring to FIGS. 4 and 5, the portion of the stub 34 extending above the airfoil sections 38 is extruded into the platform troughs 40 of the die halves 26,28. The exact amount of blade stub 34 ("x") left to extend above the airfoil sections 38 is generally chosen such that the volume of the stub 34 extending above the airfoil sections 38 equals a substantial portion of the platform troughs 40 surrounding the unextruded blade stub 34. Sizing the portion "x" of the airfoil stub in the above described manner relative to the platform troughs, ensures that a desirable bond surface is created, while still providing space for any upset that might flow from the bond joint during bonding.

In a first embodiment, the portion "x" of the blade stub extending above the airfoil sections 38 is extruded into the platform troughs 40 of the die halves 26,28 using a hydraulically actuated flat die 47 (see FIG. 4). A "pancake" type induction coil (not shown), or other heating means, is used to raise the temperature of the blade stub 34 to facilitate extrusion. The preferred temperature will depend upon the constituent material of the blade stub 34.

In a second embodiment, the portion "x" of the blade stub extending above the airfoil sections 38 is extruded into the platform troughs 40 during the bonding process. The blade stub is heated and the replacement blade is forced against the rotor blade stub, as will be discussed hereinafter. The thermal energy and pressure between the blade stub and the replacement blade cause the portion "x" of the blade stub extending above the airfoil to plastically deform and extrude in the platform troughs.

In both embodiments, the airfoil sections 38 of the die halves 26,28, which substantially conform to the external geometry of the blade stub 34, support the blade stub 34 and prevent deformation.

The replacement blade 50 preferably includes a platform 52 similar to that of the blade stub 34. The replacement blade platform 52 provides an enlarged bonding surface which protects against deformation, particularly along the leading 54 and trailing 56 edges of the replacement blade 50. The replacement blade platform 52 also provides a surface against which the bonding force may be applied. Prior to bonding, the surfaces to be bonded are cleaned of debris and any oxides that may have formed on the surfaces by techniques such as degreasing, grit blasting, chemical cleaning, and/or electrochemical polishing.

Bonding typically is performed in a high vacuum ($10^{-5}$ mm Hg) under conditions of temperature and pressure sufficient to cause metal flow. The vacuum environment inhibits the formation of oxidation on the surfaces to be bonded. The exact bonding pressure and temperature will vary depending upon the materials to be bonded. However, for typical superalloys the temperatures will be on the order of 1700°–2100° F. and the pressures forcing the replacement blade 50 and blade stub 34 together will be on the order of 5–15 ksi.

Figure 8:
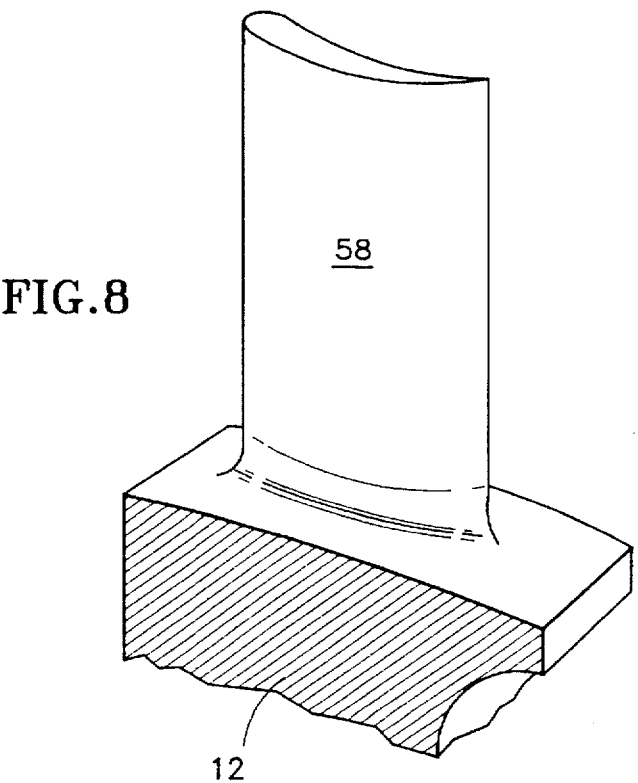
FIG. 8 shows the integral rotor blade shown in FIG. 7 after the excess material of the platform is removed.

Following bonding, the IBR 10 is removed from the fixture (not shown) and the blade repair die 24 is removed from the IBR 10. The platforms 46,52, and any upset that may have flowed out from the bond joint during bonding, are subsequently machined using conventional machining techniques. The repaired blade 58 (see FIG. 8) is machined until the desired blade profile remains. Following machining, the portion of the repaired blade 58 which has been bonded can be locally heat treated to ensure adequate mechanical properties.

Although this invention has been shown and described with respect to the detailed embodiments thereof, it will be understood by those skilled in the art that various changes in form and detail thereof may be made without departing from the spirit and the scope of the invention. For example, the preferred embodiment of the die includes two halves. In alternative embodiments, the die may include more than two pieces. In addition, the best mode detailed heretofore describes the present method of blade attachment in terms of a blade repair. The present method can also be used to join blades to a disk for purposes of fabricating a new IBR.

We claim:

1. A method for replacing a rotor blade on an integrally bladed rotor having a disk, comprising the steps of:
    (a) removing a rotor blade, leaving a stub portion of said rotor blade extending out from the disk, said stub portion of said rotor blade having a leading edge, a trailing edge, a suction side, and a pressure side;
    (b) providing a blade repair die, having
        a pressure side, with a first recess, said first recess having an first airfoil section shaped to receive said pressure side of said rotor blade stub, and a first platform trough;
        a suction side, with a second recess, said second recess having a second airfoil section shaped to receive said suction side of said rotor blade stub, and a second platform trough;
    (c) fastening said blade repair die to said rotor blade stub, said pressure side of said die positioned on said pressure side of said stub, and said suction side of said die positioned on said suction side of said stub;
    (d) extruding a portion of said rotor blade stub into said first and second platform troughs, thereby creating a platform; and
    (e) attaching a replacement rotor blade to said platform.

2. A method for replacing a rotor blade according to claim 1, wherein said pressure side of said die and said suction side of said die are separable from one another.

3. A method for replacing a rotor blade according to claim 2, further comprising the step of:
    removing any platform material in excess of that desired for said replacement rotor blade.

4. A method for replacing a rotor blade according to claim 3, further comprising the step of:
    heating said blade stub prior to said extruding step, wherein said heating facilitates said extrusion of said portion of said blade stub into said first and second platform troughs.

5. A method for replacing a rotor blade on an integrally bladed rotor having a disk, comprising the steps of:
    (a) removing a rotor blade, leaving a stub portion of said rotor blade extending out from the disk, said stub portion of said rotor blade having a leading edge, a trailing edge, a suction side, and a pressure side;
    (b) providing a blade repair die, having
        a pressure side, with a first recess, said first recess having an first airfoil section shaped to receive said pressure side of said rotor blade stub, and a first platform trough;
        a suction side, with a second recess, said second recess having a second airfoil section shaped to receive said suction side of said rotor blade stub, and a second platform trough;
    (c) fastening said blade repair die to said rotor blade stub, said pressure side of said die positioned on said pressure side of said stub, and said suction side of said die positioned on said suction side of said stub;
    (d) providing a replacement rotor blade; and
    (e) bonding said replacement rotor blade to said rotor blade stub, wherein a portion of said rotor blade stub extrudes into said first and second platform troughs of said die during said bonding.

6. A method for replacing a rotor blade according to claim 5, wherein said replacement blade includes a platform extending out from said replacement blade adjacent a surface to be bonded to said rotor blade stub.

7. A method for replacing a rotor blade according to claim 6, wherein said replacement blade is forced into contact with said rotor blade stub during said bonding step by applying force to said platform of said replacement blade.

8. A method for replacing a rotor blade according to claim 7, wherein said pressure side of said die and said suction side of said die are separable from one another.

9. A method for replacing a rotor blade according to claim 8, further comprising the step of:
    removing any platform material in excess of that desired for said replacement rotor blade.

10. A method for replacing a rotor blade according to claim 5, wherein a portion of said replacement blade extrudes into said first and second platform troughs of said die during bonding.

11. A method for replacing a rotor blade according to claim 10, wherein said pressure side of said die and said suction side of said die are separable from one another.

12. A method for replacing a rotor blade according to claim 11, further comprising the step of:
    removing any platform material in excess of that desired for said replacement rotor blade.

13. A method for fabricating an integrally bladed rotor, comprising the steps of:
    (a) providing a disk, having a plurality of rotor blade stubs extending outwardly from said disk, said rotor blade stubs disposed about the circumference of said disk, and each said rotor blade stub having a leading edge, a trailing edge, a suction side, and a pressure side;
    (b) providing a plurality of rotor blades;
    (c) providing a blade attachment die, having
        a pressure side, with a first recess, said first recess having an first airfoil section shaped to receive said pressure side of one of said rotor blade stubs, and a first platform trough;
        a suction side, with a second recess, said second recess having a second airfoil section shaped to receive said suction side of one of said rotor blade stubs, and a second platform trough;
    (d) fastening said blade attachment die to one of said rotor blade stubs, said pressure side of said die positioned on said pressure side of said rotor blade stub, and said suction side of said die positioned on said suction side of said rotor blade stub;
    (d) extruding a portion of said rotor blade stub into said first and second platform troughs, thereby creating a platform; and
    (e) attaching one of said rotor blades to said platform.

14. A method for fabricating an integrally bladed rotor according to claim 13, wherein said pressure side of said die and said suction side of said die are separable from one another.

15. A method for fabricating an integrally bladed rotor according to claim 14, further comprising the step of:

removing any platform material in excess of that desired for said rotor blade.

16. A method for fabricating an integrally bladed rotor according to claim 15, further comprising the step of:

heating said blade stub prior to said extruding step, wherein said heating facilitates said extrusion of said portion of said blade stub into said first and second platform troughs.

17. A method for fabricating an integrally bladed rotor, comprising the steps of:

(a) providing a disk, having a plurality of rotor blade stubs extending outwardly from said disk, said rotor blade stubs disposed about the circumference of said disk, and each said rotor blade stub having a leading edge, a trailing edge, a suction side, and a pressure side;

(b) providing a plurality of rotor blades;

(c) providing a blade attachment die, having a pressure side, with a first recess, said first recess having an first airfoil section shaped to receive said pressure side of said rotor blade stub, and a first platform trough;

a suction side, with a second recess, said second recess having a second airfoil section shaped to receive said suction side of said rotor blade stub, and a second platform trough;

(d) fastening said blade attachment die to said rotor blade stub, said pressure side of said die positioned on said pressure side of said stub, and said suction side of said die positioned on said suction side of said stub; and (e) bonding one of said rotor blades to one of said rotor blade stubs, wherein a portion of said rotor blade stub extrudes into said first and second platform troughs of said die during said bonding.

18. A method for fabricating an integrally bladed rotor according to claim 17, wherein said rotor blade includes a platform extending out from said rotor blade adjacent a surface to be bonded to said rotor blade stub.

19. A method for fabricating an integrally bladed rotor according to claim 18, wherein said rotor blades are forced into contact with said rotor blade stubs during said bonding step by applying force to said platforms of said replacement blades.

20. A method for fabricating an integrally bladed rotor according to claim 19, wherein said pressure side of said die and said suction side of said die are separable from one another.

21. A method for fabricating an integrally bladed rotor according to claim 20, further comprising the step of:

removing any platform material in excess of that desired for said rotor blade.

22. A method for fabricating an integrally bladed rotor according to claim 17, wherein a portion of each said rotor blade extrudes into said first and second platform troughs of said die during bonding.

23. A method for fabricating an integrally bladed rotor according to claim 22, further comprising the step of:

removing any platform material in excess of that desired for said rotor blade.

24. A method for fabricating an integrally bladed rotor, comprising the steps of:

(a) providing a disk, having a plurality of rotor blade stubs extending outwardly from said disk, said rotor blade stubs disposed about the circumference of said disk, and each said rotor blade stub having a platform, a leading edge, a trailing edge, a suction side, and a pressure side;

(b) providing a plurality of rotor blades;

(c) providing a blade attachment die, having a pressure side, with a first recess, said first recess having an first airfoil section shaped to receive said pressure side of said rotor blade stub, and a first platform trough;

a suction side, with a second recess, said second recess having a second airfoil section shaped to receive said suction side of said rotor blade stub, and a second platform trough;

(d) fastening said blade attachment die to said rotor blade stub, said pressure side of said die positioned on said pressure side of said stub, and said suction side of said die positioned on said suction side of said stub, and said blade stub platform extending into said first and second platform troughs; and (e) bonding one of said rotor blades to one of said rotor blade stubs, wherein a portion of each said rotor blade extrudes into said first and second platform troughs of said die during said bonding.

25. A method for fabricating an integrally bladed rotor according to claim 24, further comprising the step of:

removing any platform material in excess of that desired for said rotor blade.

* * * * *